US011248912B2

(12) United States Patent
Mitra et al.

(10) Patent No.: US 11,248,912 B2
(45) Date of Patent: Feb. 15, 2022

(54) SYSTEM AND METHODS FOR SIMULATIONS OF VEHICLE-BASED ITEM DELIVERY

(71) Applicant: Ford Global Technologies, LLC, Dearborn, MI (US)

(72) Inventors: Pramita Mitra, West Bloomfield, MI (US); David Melcher, Ypsilanti, MI (US); Abhishek Sharma, Ann Arbor, MI (US); Prashant Rao, Ypsilanti, MI (US); Amanuel Zeryihun, Pinole, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 16/533,961

(22) Filed: Aug. 7, 2019

(65) Prior Publication Data

US 2021/0041241 A1 Feb. 11, 2021

(51) Int. Cl.
*G01C 21/20* (2006.01)
*G05B 13/04* (2006.01)
(Continued)

(52) U.S. Cl.
CPC ............ *G01C 21/20* (2013.01); *B64C 39/024* (2013.01); *G05B 13/042* (2013.01);
(Continued)

(58) Field of Classification Search
CPC ........ G01C 21/20; G01C 21/26; G01C 21/34; G01C 21/36; G01C 21/3617;
(Continued)

(56) References Cited

U.S. PATENT DOCUMENTS 9,494,937 B2   11/2016   Siegel et al.
9,792,576 B1   10/2017   Jamjoom et al.
(Continued)

FOREIGN PATENT DOCUMENTS

WO    2018/065977 A1    4/2018

OTHER PUBLICATIONS

Al Jed, et al. Mathematical modeling of aging factors for Li-ion battery cells, In Proceedings of the IEEE Vehicle Power and Propulsion Conference, 2010 (4 pages).
(Continued)

*Primary Examiner* — Yonel Beaulieu
(74) *Attorney, Agent, or Firm* — Brandon Hicks; Eversheds Sutherland (US) LLP

(57) ABSTRACT

Systems, methods, and computer-readable media are disclosed for simulations of vehicle-based item delivery. In some examples, a method can include generating a simulation of at least a portion of an environment in which items are to be delivered by a delivery vehicle; determining delivery locations associated with at least one delivery route for the delivery vehicle in the environment within the simulation; determining delivery location groups for the delivery location based on a delivery range of drones associated with the delivery vehicles; and determining waypoints for the delivery vehicle on the delivery route based on a minimum travel time associated with at least one drone of the drones.

18 Claims, 10 Drawing Sheets

(51) Int. Cl.
*B64C 39/02* (2006.01)
*G06Q 10/08* (2012.01)
*G06Q 10/04* (2012.01)

(52) U.S. Cl.
CPC ..... *G06Q 10/047* (2013.01); *G06Q 10/08355* (2013.01); *B64C 2201/027* (2013.01); *B64C 2201/066* (2013.01); *B64C 2201/128* (2013.01); *B64C 2201/146* (2013.01)

(58) Field of Classification Search
CPC .. G01C 21/3423; G05B 13/042; G05B 13/00; B64C 39/024; B64C 2201/066; B64C 2201/027; B64C 2201/128; B64C 2201/146; G06Q 10/00; G06Q 10/08355; G06Q 10/047; G06F 30/20
See application file for complete search history.

(56) References Cited

U.S. PATENT DOCUMENTS

| | | | | |
|---|---|---|---|---|
| 10,556,334 | B1* | 2/2020 | Theobald | G06N 20/00 |
| 10,776,744 | B1* | 9/2020 | Kimchi | G06F 30/20 |
| 10,789,567 | B1* | 9/2020 | Ur | G06Q 10/0832 |
| 11,086,312 | B2* | 8/2021 | Charlton | F41H 11/00 |
| 11,094,202 | B2* | 8/2021 | Gong | G08G 5/0013 |
| 11,101,376 | B2* | 8/2021 | Pillarisetty | H01L 29/7606 |
| 2017/0011340 | A1* | 1/2017 | Gabbai | G06Q 10/08355 |
| 2017/0043871 | A1* | 2/2017 | Takayama | B64D 1/02 |
| 2017/0253334 | A1* | 9/2017 | Takayama | B64D 1/12 |
| 2017/0286892 | A1* | 10/2017 | Studnicka | G06Q 20/204 |
| 2017/0320569 | A1* | 11/2017 | Gordon | B64C 39/024 |
| 2018/0088598 | A1* | 3/2018 | Lection | B64C 39/024 |
| 2018/0300834 | A1* | 10/2018 | High | G05D 1/0088 |
| 2018/0374034 | A1* | 12/2018 | Dreano, Jr. | G06Q 30/0635 |
| 2019/0041852 | A1 | 2/2019 | Schubert et al. | |
| 2019/0066041 | A1 | 2/2019 | Hance et al. | |
| 2019/0233102 | A1* | 8/2019 | Kaneichi | B64C 39/024 |
| 2020/0206962 | A1* | 7/2020 | Sohmshetty | B25J 19/005 |
| 2020/0286034 | A1* | 9/2020 | Ur | G06Q 10/047 |

OTHER PUBLICATIONS

Campbell (2017) Strategic Design for Delivery with Trucks and Drones, pp. 1-38.
De Benedetti, et al., "3D Simulation of Unmanned Aerial Vehicles" In Proceedings of CEUR Workshop, 2017, pp. 7-12.
Müller, et al., "Sim4CV: A Photo-Realistic Simulator for Computer Vision Applications," International Journal of Computer Vision, 2018, vol. 126, Issue 9, pp. 902-919.
Xu, et al., "Modeling of Lithium-Ion Battery Degradation for Cell Life Assessment", IEEE Transactions on Smart Grid, 2016, vol. 9, Issue 2, pp. 1-11.

* cited by examiner $$X = (Lat_{Delivery} - Lat_{DistributionCenter}) * 69 \text{ miles}$$
$$Y = (Lon_{Delivery} - Lon_{DistributionCenter}) * 69 \text{ miles} * \cos(Lat)$$

$$(X_1-X_2)^2 + (Y_1-Y_2)^2 < R_1+R_2$$

SYSTEM AND METHODS FOR SIMULATIONS OF VEHICLE-BASED ITEM DELIVERY

TECHNICAL FIELD

The present disclosure relates to systems, methods, and computer-readable media for simulations of deliveries, and in particular, for simulations of vehicle-based item delivery.

BACKGROUND

With the rise of e-commerce, the last mile of delivery (e.g., the movement of items from a transportation hub to a final destination, such as a customer's home or business) has become more challenging. This is in part because customers may want the added convenience of fast delivery (e.g., two-hour delivery or overnight delivery). Further, conventional last-mile delivery may be performed by delivery personnel manually delivering items from a vehicle to a delivery location, which can cause inefficiencies and delays in the delivery process. Some challenges of last mile delivery include minimizing cost, ensuring transparency, increasing efficiency and improving supporting logistics. Therefore, what are needed are systems, methods, and apparatuses for improving the last-mile delivery of items.

DETAILED DESCRIPTION

Overview

Figure 1:
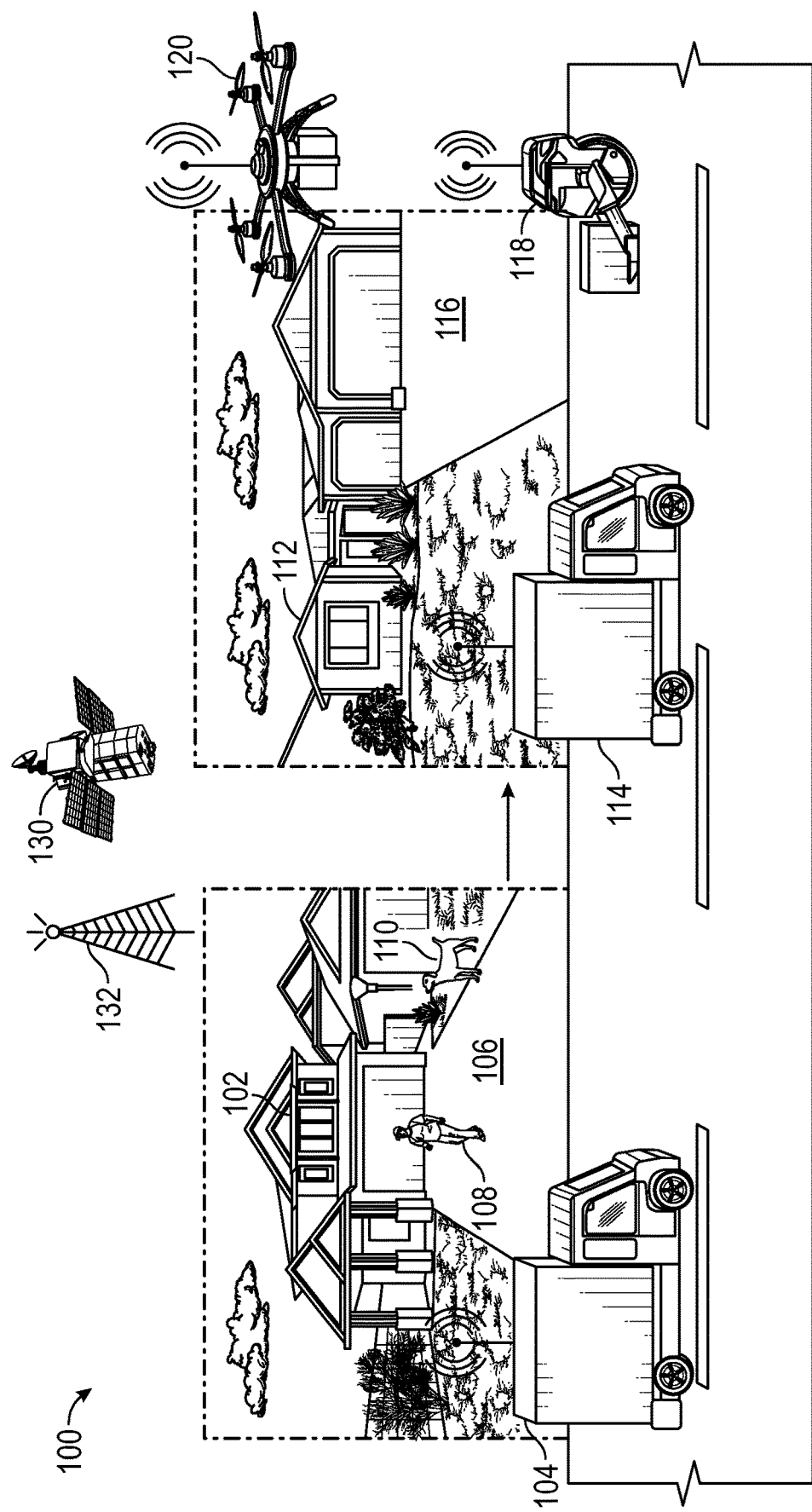
FIG. 1 is a schematic illustration of an example implementation of a simulation environment for vehicle-based item delivery, in accordance with one or more embodiments of the disclosure.

As noted, conventional last-mile delivery may be performed by delivery personnel manually delivering items from a vehicle to a delivery location. As electronic commerce increases, conventional last-mile delivery systems have become more strained. In some respects, item delivery can also be performed using unmanned autonomous systems. For example, drones can be used for delivering items from a delivery vehicle to a delivery location. In some examples, the drones may include both aerial drones and ground-based drones. Further, artificial intelligence (AI)-based algorithms and pathfinding abilities of aerial drones can also be used by ground-based drones. For example, ground-based drones can be used to deliver items in cases where the item exceeds a weight or a size limitation of an aerial drone.

Traditionally, systems that are made to overcome usability issues such as last-mile delivery scenarios are often tested in-field to ensure performance. Unfortunately, with these traditional techniques, the systems may be designed, tested, and deployed before the systems are properly vetted, leading to underperforming last-mile delivery systems. In contrast, the disclosed systems can provide a framework to design, simulate, test, and improve delivery systems before deployment. These simulations can reduce the expense and man-hours of real-world testing in introducing drone-based delivery techniques.

In some aspects, the present disclosure describes systems and methods for generating simulations of delivery scenarios such as last-mile delivery scenarios. In some examples, the simulations can be based on or can include a gaming engine, a software-development environment designed for people to build video games. Some embodiments can include a driving simulator simulating a delivery vehicle equipped with drones, driving in a simulation of a city (e.g., San Francisco). In other embodiments, a user device (e.g., a mobile phone or tablet) can allow for users to coordinate the drones in the simulation. Additionally, some embodiments can include the use of computational models for path-planning of the delivery vehicles and/or drones to reduce energy usage or to reduce the costs of last-mile delivery. In other examples, the disclosed systems can be integrated with mobile applications and/or an ecosystem of applications and servers that can be executed on mobile platforms such as a mobile phone, tablet, vehicle-based device, laptop, and/or the like. One example of such a mobile application can include a SYNC software application by FORD MOTOR COMPANY.

In some examples, the disclosure describes a waypoint-generation algorithm to optimize the delivery of items. In particular, the waypoint-generation algorithm can determine waypoints on a delivery route of a delivery vehicle, the waypoints determined to reduce delivery time and drone battery usage during deliveries. In some examples, the waypoint-generation algorithm can dynamically respond to changes in drone battery capacities and to changes in a map. For example, changes in the map can include movement of gates, additions of overhead wires, or other temporary impediments to ground and aerial drones making deliveries.

In some examples, the disclosure describes a GUI that can include an application that can be run on user devices to aid users making the deliveries. In particular, the GUI can include an application that can interface with systems that run the simulations of the deliveries using drones for a particular delivery vehicle on a given delivery route. The GUI can then obtain and present delivery instructions and commands to the drones from a user and obtains visual feedback of the drones' locations for presentation to the user. In some examples, the application can provide audio-based feedback (e.g., of delivery statuses and drone information) so that the user does not have to focus their attention on the GUI, thereby helping maintain a driver's focus on the road. Further, the GUI can be updated and rolled out to user devices to facilitate iterative, updateable design.

In some examples, the disclosed systems describe a physics-based model to drive the simulation. In particular, the physics-based model can be configured to include the effects of aging drone batteries, changing weather conditions, and/or the like on a drone's flight range.

Illustrative Embodiments

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ certain embodiments of the disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for certain applications. Various combinations and modifications of the features consistent with the teachings of this disclosure, however, could be desired for particular applications or implementations.

In conventional delivery techniques, a delivery vehicle may need to stop at each delivery location on a given delivery route. Accordingly, each delivery location can serve as a waypoint. With drone-assisted delivery techniques, one delivery vehicle waypoint may serve as many locations as available drones used in connection with the delivery vehicle.

As noted, to implement drone-assisted delivery techniques in a simulation of vehicle-based delivery of items, the disclosed systems can implement a waypoint-generation algorithm. In particular, the disclosed systems can implement a waypoint-generation algorithm that determines a grouping algorithm to divide the delivery locations into a plurality of zones. The waypoint-generation algorithm can further include a waypoint-estimation algorithm that creates stopping points for the delivery vehicle and/or launching points for the drones in a manner that reduces process costs and time. In some examples, the waypoint-generation algorithm can dynamically adapt based on operational changes, such as reduced drone battery capacity and changing environmental conditions (e.g., changing weather conditions, unpredictable addition of obstructions such as overhead wires or gates, and the like).

As noted, the disclosure describes aspects of an application including a GUI. In particular, the application can be provided on a user device such as a tablet, a mobile phone, a laptop, and the like. The application can display the current locations of the drones on a map, and the map can further include the delivery vehicle's delivery route.

Embodiments of the disclosure can have at least the following advantages. The disclosed systems can represent an inexpensive and time-efficient simulation to evaluate last-mile delivery scenarios. Accordingly, variables (e.g., environmental variables such as weather patterns) can be introduced in a controlled simulation environment to assess the variables' effects on last-mile delivery. In some examples, the disclosed systems can enable users to evaluate a delivery scenario of a technology that may not be ripe for physical implementation. Further, the disclosed systems can demonstrate quantifiable benefits of last-mile delivery of items using drones as compared with standard manual delivery techniques.

FIG. 1 is a schematic illustration of an example implementation of a simulation environment for vehicle-based item delivery, in accordance with one or more embodiments of the disclosure. Diagram 100 illustrates some example scenarios in which the disclosed systems may perform vehicle-based item delivery. It is to be understood that the example scenarios shown in diagram 100 are not limiting as to the scope of the disclosure's possible applications.

Diagram 100 shows a first residence 102 including a first driveway 106, a delivery vehicle 104, a user 108 standing in the first driveway 106, and a dog 110. In particular, the delivery vehicle 104 may drive on street 105 and may carry various items including items to be delivered to the first residence 102 at a first waypoint. One or more devices of the delivery vehicle 104 may determine that the user 108 is standing in the first driveway 106. For example, a camera of the delivery vehicle 104 may be configured to capture image data, such as a video, of the first residence 102. The disclosed systems analyze the video data using any suitable AI-based technique to detect the presence of the user 108 and/or the dog 110. In particular, the disclosed systems may determine that while it may be possible to deliver the item using a delivery vehicle, the presence of the user 108 and proximity to the delivery vehicle 104 may make it unreasonable to deliver the item using a delivery vehicle. For example, the delivery vehicle 104 may determine that it would lose additional time in deploying a delivery vehicle to deliver the item when the user 108 may quickly pick up the item from the delivery vehicle 104. Further, the presence of the dog 110 in proximity to the delivery vehicle 104 may make it more difficult for the delivery vehicle to successfully deliver the item. For example, the disclosed systems may determine that the dog is likely to engage with the delivery vehicle and disturb the delivery vehicles path to delivering the item. For both these reasons, the delivery vehicle 104 may determine to allow the user 108 to pick up the item from the delivery vehicle 104.

Diagram 100 further shows a second residence 112 including a second driveway 116, and a vehicle 114 which may correspond to the same delivery vehicle 104 at the second residence 112 instead of the first residence 102 at a second waypoint. Diagram 100 also includes a ground-based delivery drone 118 and an unmanned aerial vehicle (UAV) 120, also referred to herein as a drone or an aerial drone. In particular, one or more devices of the delivery vehicle 104 may determine that the second residence 112 is suitable for an automated delivery of the item. For example, the camera of the delivery vehicle 104 may be configured to capture image data, such as a video, of the second residence 112. The disclosed systems may analyze the video data using an AI-based technique to determine that the second driveway 116 is clear (for example, that the second driveway 116 does not contain any delivery vehicles or obstacles). In particular, the disclosed systems may determine that it is possible to deliver the item to the second residence 112 using a delivery vehicle, at least because there are no obstructions to the path that the delivery vehicle would take in making the delivery. Further, the disclosed systems may determine that it is preferable to deliver the item to the second residence 112 using the delivery vehicle, at least because there is no immediate indication of any difficulties associated with making such a delivery using the delivery vehicle. The disclosed systems may dispatch the ground-based delivery drone 118 to deliver the item to the second residence 112. For instance, the ground-based delivery drone 118 may take the item and drop it off at the front door or the back door of the second residence 112. In other examples, the disclosed systems may determine that there are no immediate obstructions to the flight path of the UAV 120 from the AV 114 to the residence 112. Accordingly, the disclosed systems may dispatch the UAV 120 to take the item through the air thereby bypassing the second driveway 116 and dropping off the item at the front door or the back door of the second residence 112.

In other examples, the disclosed systems may identify and analyze various features of the environment and/or the second residence 112 to make a determination of whether to deliver the item using the UAV 120, a ground-based delivery drone 118, or to request that a user 108 pickup the item from the delivery vehicle 104. As noted, the disclosed systems may analyze features such as the presence of a user, a pet such as a dog, and obstacles such as cars in the driveway of a residence and/or the like to determine the possibility of making the delivery of the item to a location. Upon determining that the possibility of making such a delivery is beyond a given threshold, the disclosed systems may further analyze data such as user preferences, weather reports, and/or the like, to determine to make a delivery to the location using a delivery vehicle. In particular, to determine the delivery capability reflecting the possibility of delivering the item using a delivery vehicle (such as an aerial drone or a ground-based delivery drone), the disclosed systems may perform numerous analyses. For example, the disclosed systems can analyze satellite imagery from a satellite 130 to determine a residence layout (for example, associated with the first residence 102 or second residence 112). Accordingly, the delivery vehicle 104 may identify that the residence layout includes a residence type (for example, a single-family home), may determine a backyard size, may identify the presence of trees, and/or the like.

The disclosed systems may determine the possibility of delivering the item using a delivery vehicle using various item characteristics. In particular, the disclosed systems may determine an item size and weight and/or special item characteristics (for example, unbalanced, fragile, etc.) to determine the possibility of delivery. For example, if the disclosed systems determined that the item is too heavy for a given delivery vehicle, the disclosed systems may determine not to deliver the item using the delivery vehicle. The disclosed systems may determine the past success rates of a UAV-based delivery under similar environmental conditions and/or may identify rate of user complaints from a database to determine the possibility of delivering the item using a delivery vehicle.

The disclosed systems may determine the available path for the delivery vehicle 104 or delivery vehicle to drop off the items at the location. Moreover, the disclosed systems may determine a corresponding distance along the path. In some examples, the disclosed systems may determine a weather condition along the path. For instance, the disclosed systems may determine a snow coverage along the path using the above-described techniques.

In some examples, the delivery vehicle 104 may be any suitable vehicle such as a car, truck, recreational vehicle (RV), boat, plane, etc., and may be equipped with suitable hardware and software that enables it to communicate over a network, such as a local area network (LAN).

In another embodiment, the delivery vehicle 104 may include a variety of sensors that may aid the vehicle in navigation, such as radio detection and ranging (RADAR), light detection and ranging (LIDAR), cameras, magnetometers, ultrasound, barometers, and the like. In one embodiment, the sensors and other devices of the delivery vehicle 104 may communicate over a network connection. In other embodiments, the delivery vehicle 104 and/or a delivery vehicle may communicate with the user at a user device using the network connection. Examples of suitable network connections include a controller area network (CAN), a media-oriented system transfer (MOST), a local interconnection network (LIN), a cellular network, a Wi-Fi network, and other appropriate connections such as those that conform with known standards and specifications (for example, one or more Institute of Electrical and Electronics Engineers (IEEE) standards, and the like).

In another aspect, diagram 100 shows satellite 130 and one or more cellular towers 132. In another embodiment, the delivery vehicle 104 may include a transceiver, which in turn may include one or more location receivers (for example, global positioning system (GPS) receivers) that may receive location signals (for example, GPS signals) from one or more satellites 130. In another embodiment, a GPS receiver may refer to a device that can receive information from GPS satellites (for example, satellites 130) and calculate the vehicle's 104 geographical position.

Figure 2:
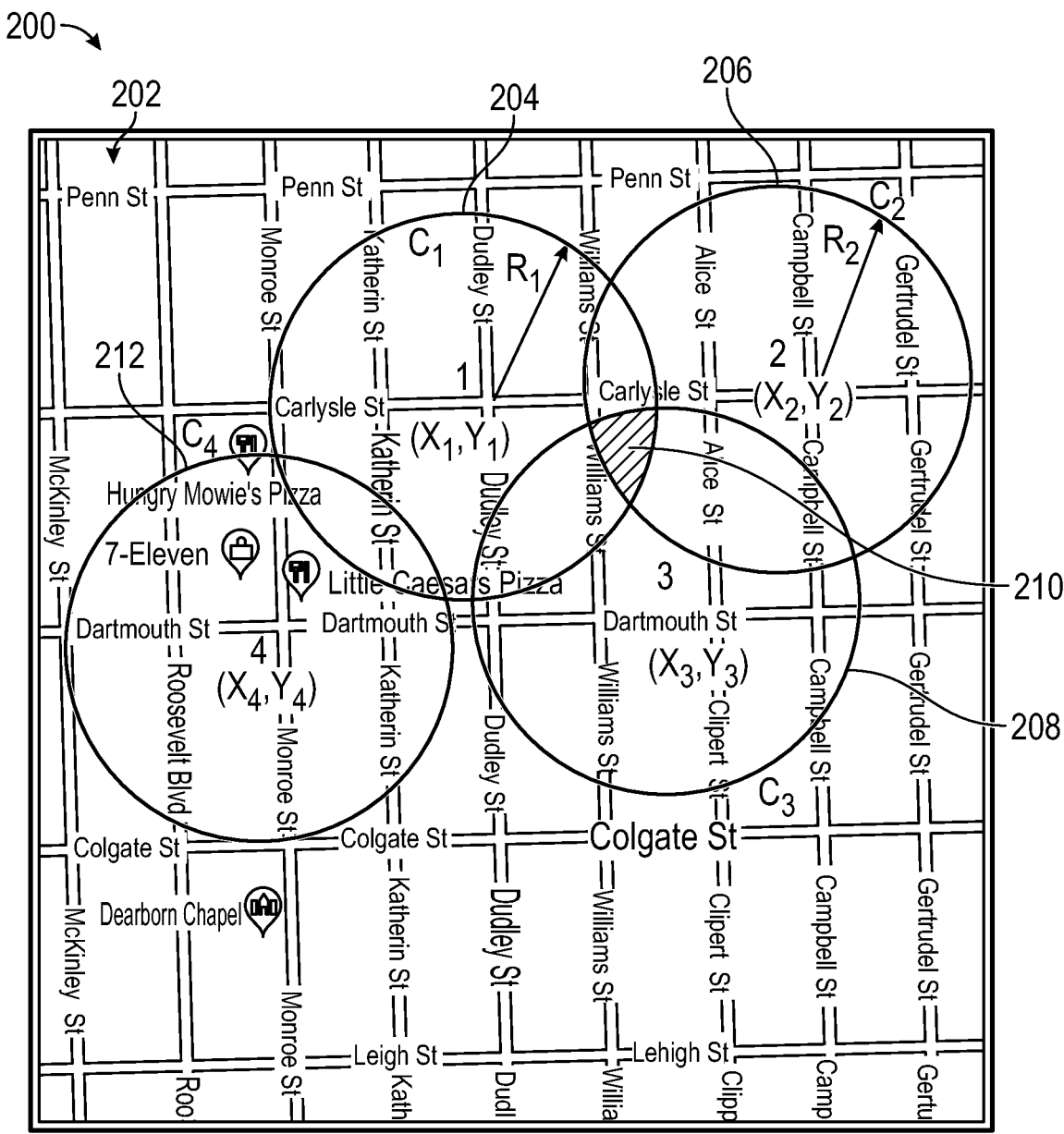
FIG. 2 shows a diagram illustrating a mathematical basis for generating delivery groups for delivery locations on a delivery route in the simulation of vehicle-based item delivery, in accordance with example embodiments of the disclosure.

FIG. 2 shows a diagram illustrating a mathematical basis for generating delivery groups for delivery locations on a delivery route in the simulation of vehicle-based item delivery, in accordance with example embodiments of the disclosure. Diagram 202 includes a map that depicts various delivery locations. In particular, the delivery locations include location 1 having coordinates (X1, Y1), location 2 having coordinates (X2, Y2), location 3 having coordinates (X3, Y3), and location 4 having coordinates (X4, Y4). In some examples, the coordinates of the delivery locations may be presented as (X, Y) coordinates determined from latitude and longitudinal coordinates. In particular, the X coordinate for a particular delivery location may be determined based on the difference between the latitude of the delivery location and the latitude of the distribution center, as shown in equation 214. Further, the Y coordinate for a particular delivery location may be determined based on the difference between the longitude of the delivery location and the longitude of the distribution center, along with the cosine of the latitude, as shown in equation 214.

In some examples, the delivery locations near the delivery vehicle can be inscribed with circles having a radius equal to a safe delivery distance and delivery locations as the center. For instance, location 1 may include a circle 204 having radius R1, location 2 may include a circle 206 having radius R2, location 3 may include a circle 208 having radius R3, and location 4 may include a circle 212 having radius R4. In some examples, the radii can be based on a safe delivery distance of the delivery drones. In particular, this safe delivery distance can be defined as about 40% of a given drone's load-carrying range to account for the drone's return trip after delivery and an additional safety margin.

In other examples, the area of overlap between two circles having center coordinates X1, Y1 and X2, Y2 and having radii R1 and R2, respectively can be determined from equation 216. A similar equation can be used to find the overlap 210 between circle 204, circle 206, and circle 208. In some examples, the disclosed systems may determine waypoints that are based on the maximum overlap between delivery points. The disclosed systems can determine delivery groups to maximize this overlap. For example, in diagram 202, the disclosed systems may seek to generate a delivery group associated with delivery locations 1, 2, and 3, which may have the area of greatest overlap 210. In this example, location 4 having associated circle 212 may not have sufficient overlap with the delivery locations in the delivery group including locations 1, 2, and 3. Accordingly, the disclosed systems may categorize location 4 as belonging to a different delivery group as the delivery group for location 1, 2, and 3.

As described above in connection with the diagram 200, the delivery locations on a delivery route can be organized into delivery groups. In some examples, the delivery groups can be formed around areas where the highest number of circles overlap, up to the total number of drones available on the delivery vehicle. Once the delivery groups are formed and bounding area for the waypoint of each delivery group is determined, the disclosed systems can generate the waypoints. In particular, the waypoint can be positioned in the area of overlap to optimize for a number of conditions, as further detailed below.

Figure 3A:
FIG. 3A shows a diagram illustrating a mathematical basis for generating a waypoint for delivery locations on a delivery route in the simulation of vehicle-based item delivery, in accordance with example embodiments of the disclosure.

FIG. 3A shows a diagram illustrating a mathematical basis for generating a waypoint for delivery locations on a delivery route in the simulation of vehicle-based item delivery, in accordance with example embodiments of the disclosure. Diagram 300 includes a portion of the map with certain potential delivery locations, for example, delivery locations 303, 305, 306, and 307. In some examples, the disclosed systems can generate a circle that includes (within or on the boundary of the circle) the maximum number of potential delivery locations in a given portion of the map within a certain minimum radius. For example, as depicted in diagram 300, the disclosed systems can generate a circle 304 having central location 302. Such a circle 304 can include delivery locations 303, 305, 306, and 307. In particular, the disclosed systems have generated circle 304 to include the delivery locations in the portion of the map shown in diagram 300.

In some examples, to minimize the amount of time the delivery vehicle waits for drones to return, the disclosed systems can minimize the trip of the drone that must travel the farthest to its delivery location. The disclosed systems can perform this minimization by generating the smallest circle that encompasses the delivery locations and setting vehicle waypoint at the center of the circle (e.g., circle 304 having central location 302). In some examples, the disclosed systems can determine the smallest circle can be using Welzl's algorithm, an algorithm that computes the smallest circle that contains all of a given set of points in a Euclidean plane. In some aspects, minimizing the total distance traveled by the farthest flying drone may negatively impact the distance traveled by other drones (increase other drone's travel distance). In such a case, the drones may incur higher battery drain, and there may be additional delays to the overall delivery time as the driver may need to wait for drones to recharge.

Figure 3B:
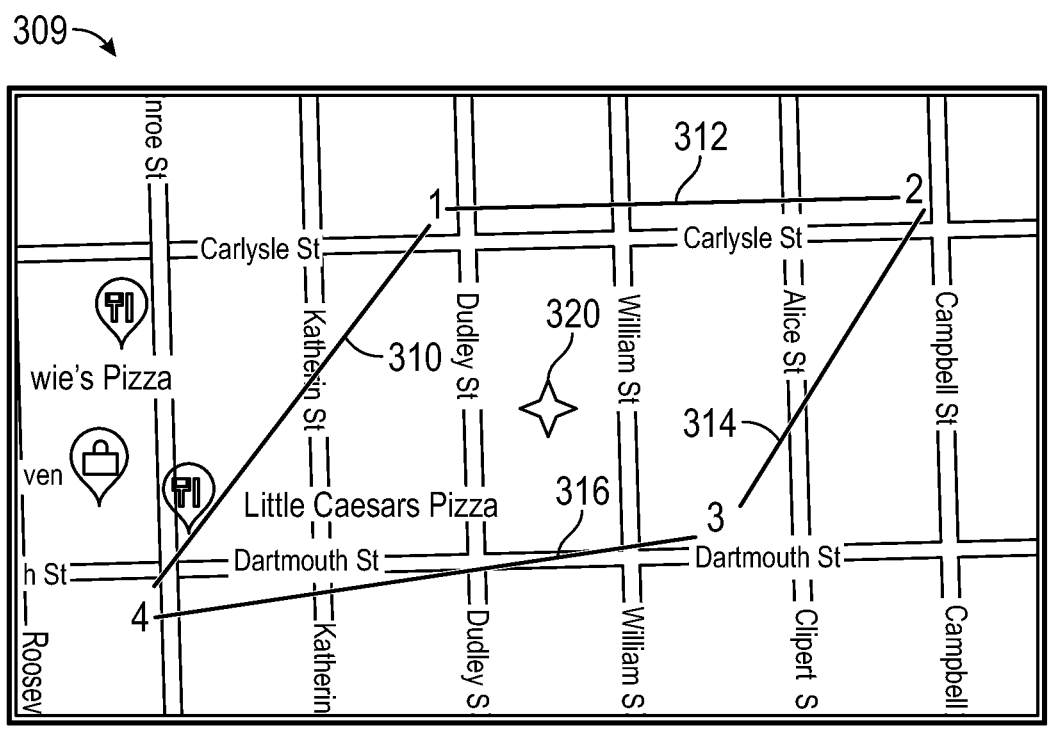
FIG. 3B shows another diagram illustrating a mathematical basis for generating a waypoint for the delivery locations, in accordance with example embodiments of the disclosure.

FIG. 3B shows another diagram illustrating a mathematical basis for generating a waypoint for the delivery locations, in accordance with example embodiments of the disclosure. In cases where the inter-delivery group distance is smaller than a predetermined threshold (i.e., leading to less time to recharge the drones), the disclosed systems can set a waypoint on a location (e.g., a street) near the centroid of an irregular polygon formed with vertices formed by delivery locations in the group, as described in connection with diagram 309, described below. Alternatively or additionally, the disclosed systems can use the circle intersection points generated based on the delivery location groups determined in connection with FIG. 2, above, to determine the vertices of the irregular polygon. This method minimizes the total distance traveled by all drones for that delivery group.

Diagram 309 includes a different portion of a map including potential delivery locations 1, 2, 3, and 4. In particular, the disclosed systems can determine a first path 310 between locations 4 and 1, a second path 312 between locations 1 and 2, a third path 314 between locations 2 and 3, and a fourth path 316 between locations 3 and 4. In various examples, the disclosed systems may determine a central location 320 within a close polygonal shape determined by the path between the delivery locations 1, 2, 3, and 4. This can be performed by first finding the centroid of an irregular polygon, for which the disclosed systems can first find the area of the irregular polygon using the equation:

$$A = \tfrac{1}{2} \Sigma_{i=0}^{n-1} (x_i + x_{i+1})(y_i - y_{i+1}),$$

Where $x_i$ and $y_i$ represent the coordinates of each endpoint of a side of the polygon. The disclosed systems can then calculate the coordinates of the centroid, $C_x$ and $C_y$, using the equations, $$C_x = \frac{1}{6A} \sum_{i=0}^{n-1} (x_i + x_{i+1})(x_i y_{i+1} - x_{i+1} y_i), \text{ and}$$

$$C_y = \frac{1}{6A} \sum_{i=0}^{n-1} (y_i + y_{i+1})(x_i y_{i+1} - x_{i+1} y_i).$$

Figure 4:
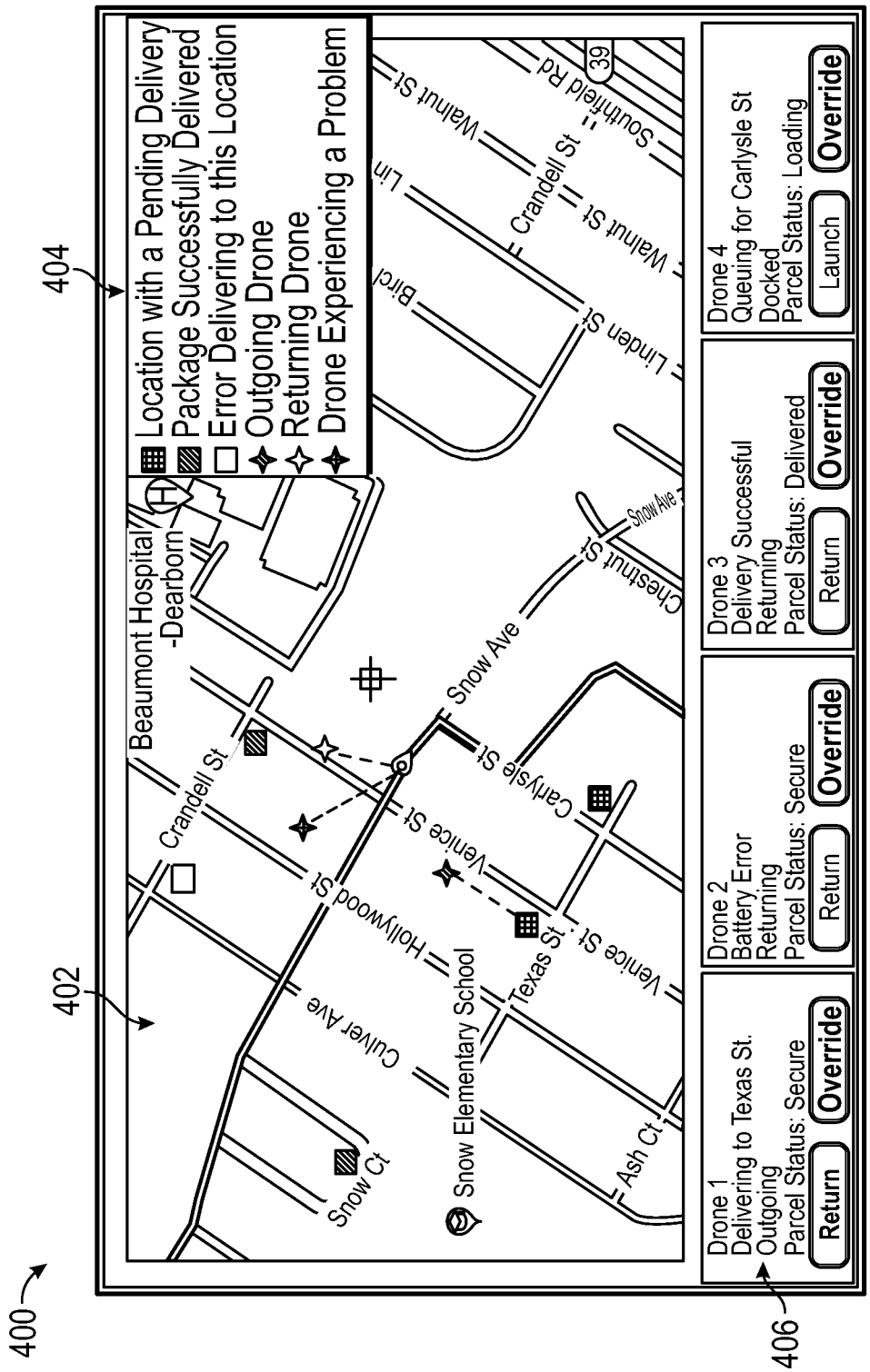
FIG. 4 shows a diagram illustrating a graphical user interface (GUI) showing delivery locations, package statuses, and delivery drone statuses, in accordance with example embodiments of the disclosure.

FIG. 4 shows a diagram illustrating a graphical user interface (GUI) showing delivery locations, package statuses, and delivery drone statuses, in accordance with example embodiments of the disclosure. Diagram 400 includes a portion of a map 402 of a given area where the disclosed systems may perform various deliveries of items using aerial and/or ground-based drones. In particular, diagram 400 includes a legend 404 that indicates the status associated with various delivery locations and aerial and/or ground-based drones. In some examples, the legend 404 includes squares that indicate the status of a delivery to a particular delivery location. For example, the legend 404 shows that a given location has a pending delivery, that a package was successfully delivered at a delivery location, and/or that there were errors in delivering a package to a given delivery location. Further, legend 404 shows symbols indicating outgoing drones, returning drones, and drones experiencing a problem. Further, diagram 400 shows the status of the drones in a status bar 406. In particular, diagram 400 shows status bar 406 having a description that indicates that the first drone 1 delivering to a given street (e.g., Texas St.) and that the parcel is secure. Status bar 406 also depicts a description that indicates that the second drone 2 is having a battery error on returning to the deployment vehicle and that the parcel is secure Similar descriptions are provided for drones 3 and 4.

In some examples, the GUI may display labels associated with the drones with default alphanumeric designations. The display labels for the drone may be renamed by users to any suitable (e.g., user-friendly) names. In some examples, the disclosed systems can receive user commands via the application using any suitable input method, including voice, gesture, and touch-based inputs.

In some examples, many aspects of the drones' activities (e.g., package identification, package mounting from a delivery vehicle, etc.) can be performed automatically. In other aspects, the disclosed systems can configure a command to launch the drones based on a user input. The user can further input commands that can override authority over automated scripts, for example, using an override button provided via the application and/or via a voice command.

In some examples, if the delivery locations are close enough to the route, some deliveries can be made without stopping the delivery vehicle. With such a process, the delivery vehicle may need to stop for areas having a relatively high concentration of deliveries.

In some examples, a ground-based drone may encounter a previously unknown obstacle in the path of the ground-based drone in real-time (such as a fence or gate, or a child's toy) that was not there when the map was last updated. In this case, the driver may take the package from the ground drone and perform a manual delivery, or the driver may clear the obstacle from the path of the ground-based drone. In some cases, an aerial drone may be hit by an object (e.g., a baseball) from a neighborhood game. The aerial drone may then crash and may need to be retrieved prior to reuse.

Figure 5:
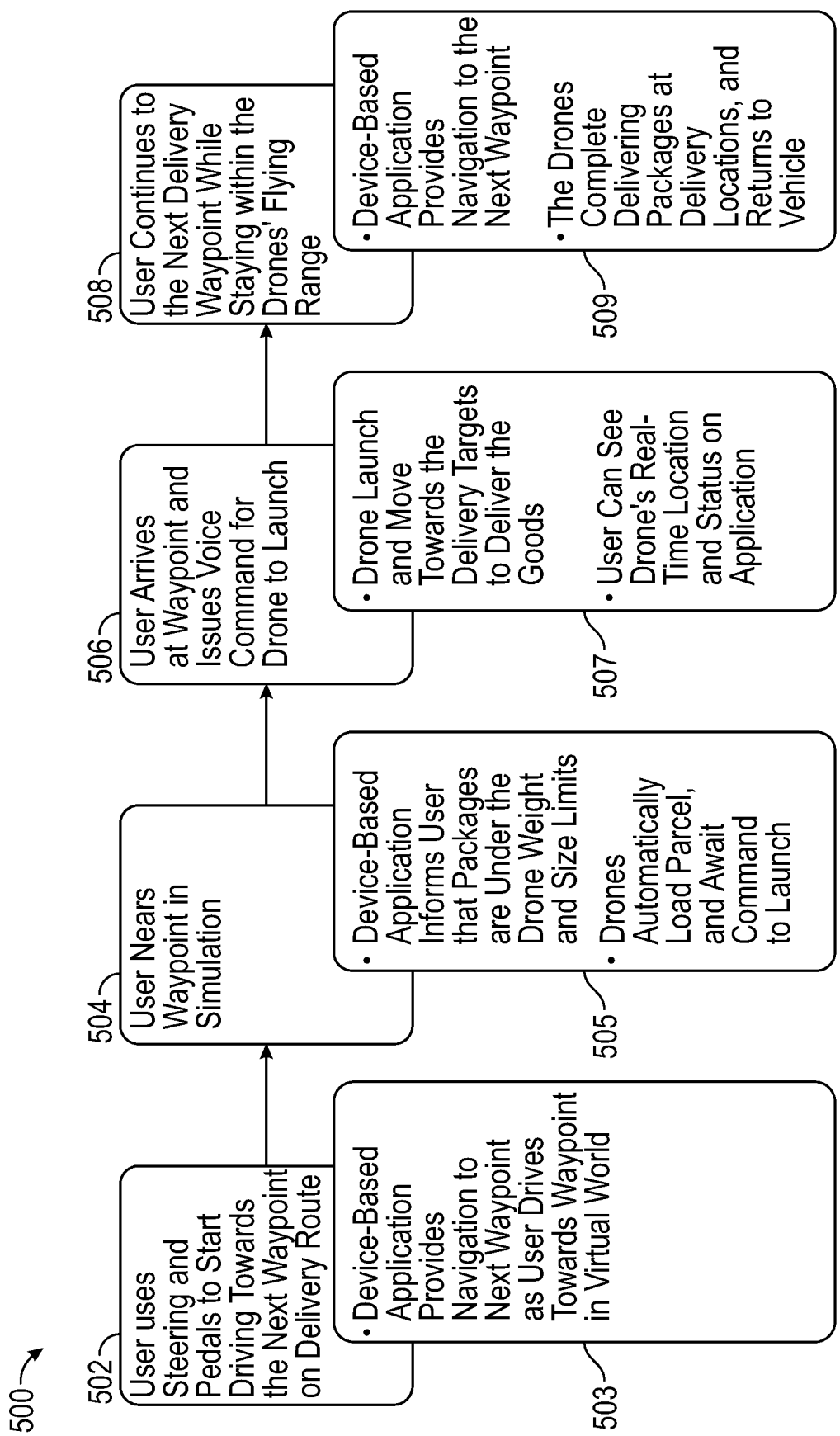
FIG. 5 shows a diagram illustrating a sequence flow of example operations in a simulation of a last-mile delivery using aerial drones, in accordance with example embodiments of the disclosure.

FIG. 5 shows a diagram illustrating a sequence flow of example operations in a simulation of a last-mile delivery using aerial drones, in accordance with example embodiments of the disclosure. At block 502, the disclosed systems may determine that the user uses the steering and pedals of a vehicle to start driving towards the next waypoint on delivery route. Accordingly, at block 503, the disclosed systems may cause the device-based application to provide navigation to the next waypoint as user drives towards the waypoint in the virtual world. At block 504, the disclosed systems may determine that the user nears the waypoint in the simulation. Accordingly, at block 505, the disclosed systems may cause the device-based application to inform the user that packages are under the drone weight and size limits. Further, the disclosed systems may configure the drones to automatically load a parcel and await for a command to launch.

At block 506, the disclosed systems may determine that the user arrives at the waypoint and issues a voice command for the drone to launch. Accordingly, at block 507, the disclosed systems may cause the drones to launch and move towards the delivery targets in order to deliver the goods. Further, the disclosed systems may enable the user to see the drone's real-time location and status on the application running on the user's device. At block 508, the disclosed systems may determine that the user continues to the next delivery waypoint while staying within the drones' flying range. Accordingly, at block 509, the disclosed systems may cause the device-based application to provide navigation to the next waypoint. Further, the disclosed systems can cause the drones to complete delivering packages at delivery locations and return to the vehicle.

Figure 6:
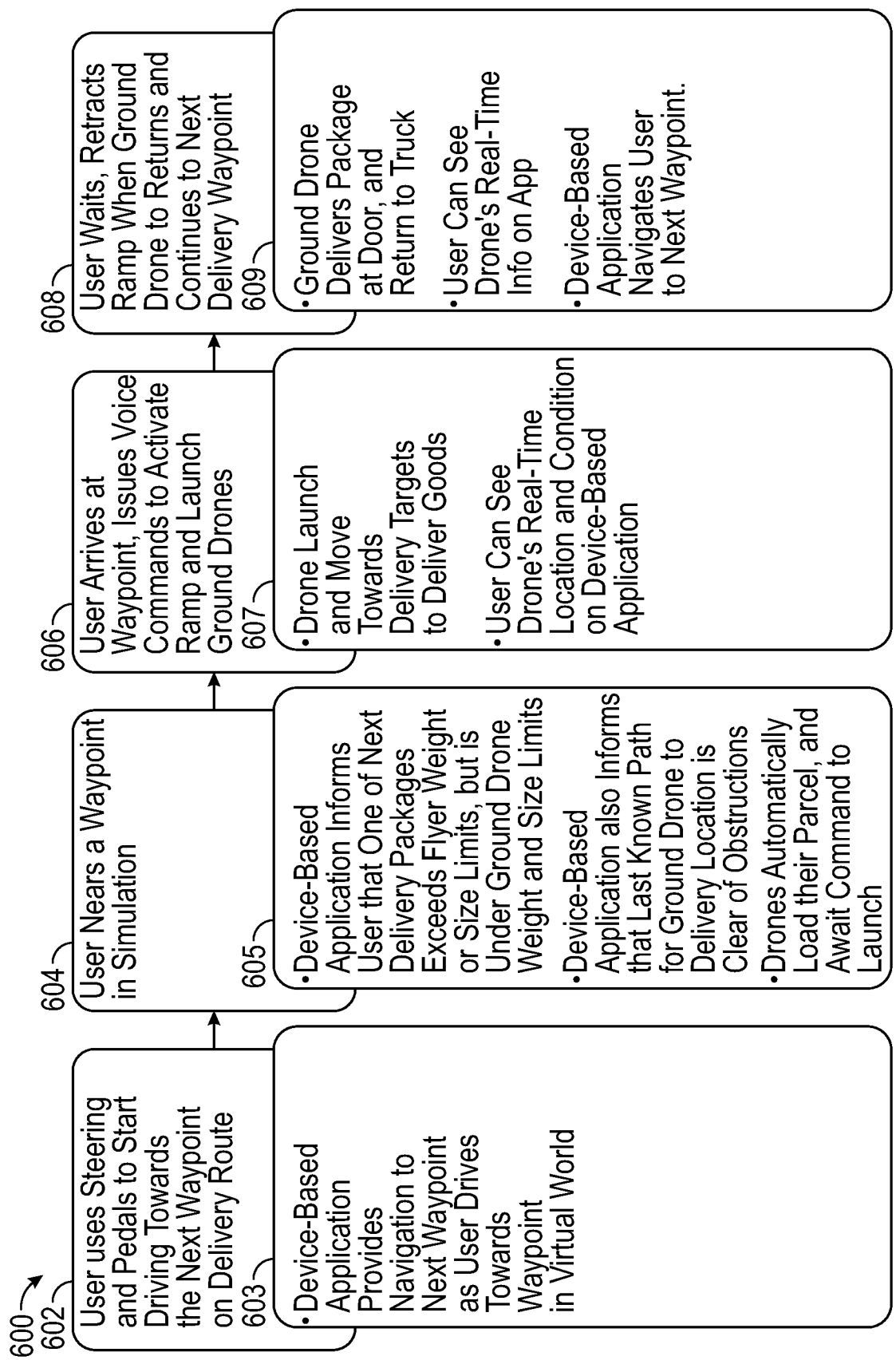
FIG. 6 shows a diagram illustrating a sequence flow of example operations in a simulation of a last-mile delivery using ground-based drones, in accordance with example embodiments of the disclosure.

FIG. 6 shows a diagram illustrating a sequence flow of example operations in a simulation of a last-mile delivery using ground-based drones, in accordance with example embodiments of the disclosure. At block 602, the disclosed systems may determine that the user uses the steering and pedals of a vehicle to start driving towards the next waypoint on delivery route. Accordingly, at block 603, the disclosed systems may cause the device-based application to provide navigation to the next waypoint as user drives towards the waypoint in the virtual world. At block 604, the disclosed systems may determine that the user nears the waypoint in the simulation. At block 605, the disclosed systems may cause the device-based application to inform the user that one of the delivery packages exceeds flyer weight or size limits, but the delivery package is under the ground drone's weight and size limits. Alternatively or additionally, the disclosed systems may cause the device-based application to inform the user that the last known path for the ground drone to the delivery location is clear of obstructions. Moreover, the disclosed systems may cause the drones to automatically load their parcel and await a command to launch.

At block 606, the disclosed systems may determine that the user arrives at waypoint and issues voice commands to activate the ramp and launch the ground drones. Accordingly, at block 607, the disclosed systems may cause the drones to launch and move towards the delivery targets to deliver the goods. Further, the disclosed systems can determine that the user sees the drone's real-time location and condition on a device-based application. At block 608, the disclosed systems may determine that the user is waiting, retracts the ramp when the ground drone returns, and continues to the next delivery waypoint. At block 609, the disclosed systems may determine that the ground drone delivers the package at the door, and returns to the truck. Further, the disclosed systems may determine that the user can see the drone's real-time info on an app. Moreover, the disclosed systems may determine that the device-based application navigates the user to the next waypoint.

Figure 7:
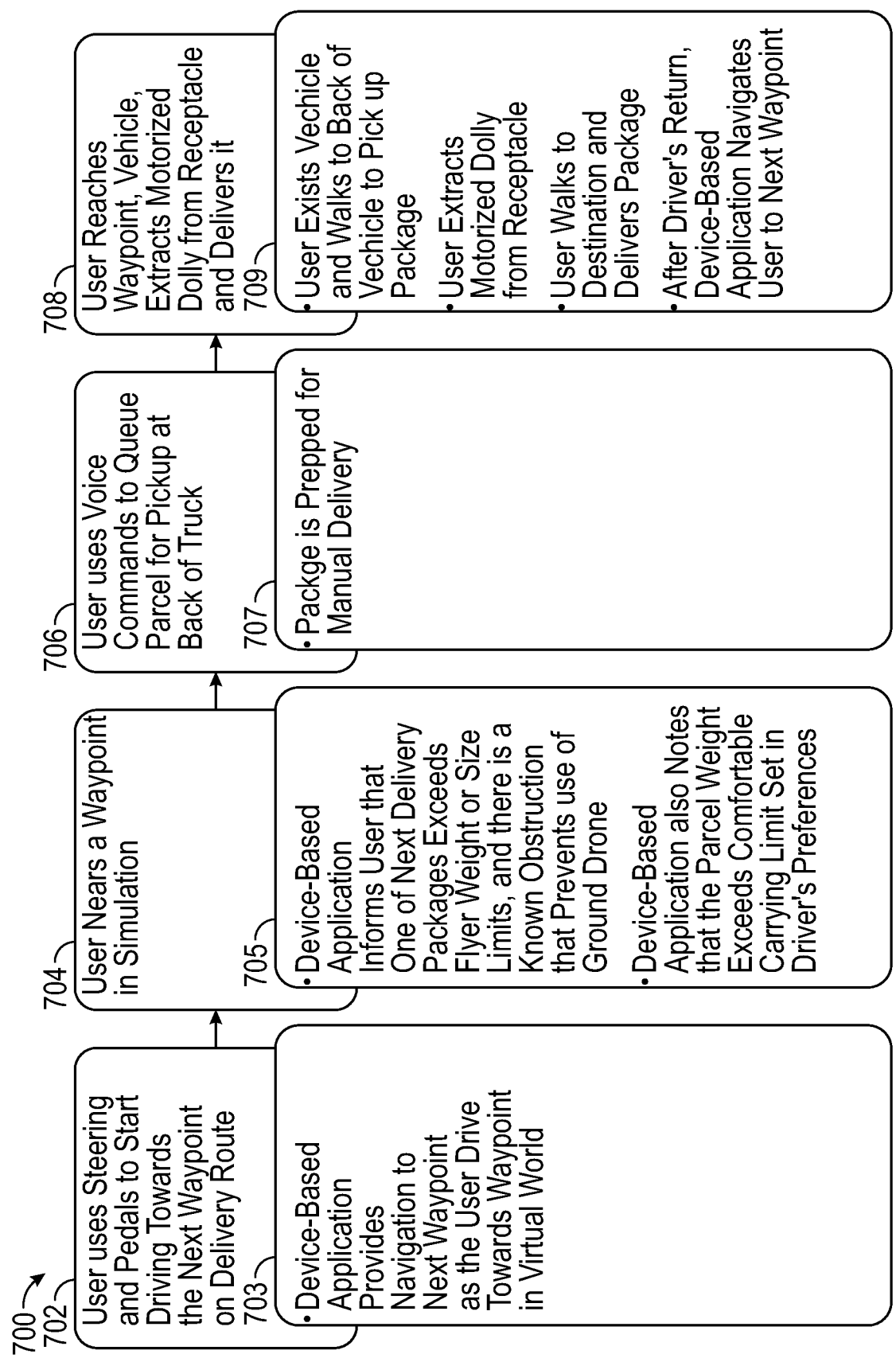
FIG. 7 shows a diagram illustrating a sequence flow of example operations in a simulation of a last-mile delivery having obstacles that impede drone-based delivery, in accordance with example embodiments of the disclosure.

FIG. 7 shows a diagram illustrating a sequence flow of example operations in a simulation of a last-mile delivery having obstacles that impede drone-based delivery, in accordance with example embodiments of the disclosure. At block 702, the disclosed systems may determine that the user uses steering and pedals to start driving towards the next waypoint on delivery route. Accordingly, at block 703, the device-based application can provide navigation to the next waypoint as the user drives towards the waypoint in the virtual world. At block 704, the disclosed systems may determine that the user is nearing a waypoint in a simulation. Accordingly, at block 705, the device-based application can inform the user that one of the next delivery packages exceeds flyer weight or size limits, and that there may be a known obstruction that prevents use of the ground drone. Further, the device-based application can also note that a package weight exceeds a threshold, for example, as set via a user's preferences.

At block 706, the disclosed systems may determine that the user uses voice commands to queue parcel for pickup at back of truck. Accordingly, at block 707, the disclosed system can be configured to cause the preparation of the package for manual delivery. At block 708, the disclosed systems may determine that the user reaches a waypoint, exits the vehicle, extracts a motorized dolly from a receptacle and delivers the dolly. Accordingly, at block 709, the disclosed systems may be configured to determine that the user exits the vehicle and walks to the back of the vehicle to pick up the package. Further, the disclosed systems may be configured to determine that the user extracts the motorized dolly from a receptacle. The disclosed systems may be configured to determine that the user walks to a destination and delivers the package. Further, after the driver's return, the disclosed systems can configure the device-based application to navigate the user to the next waypoint.

Figure 8:
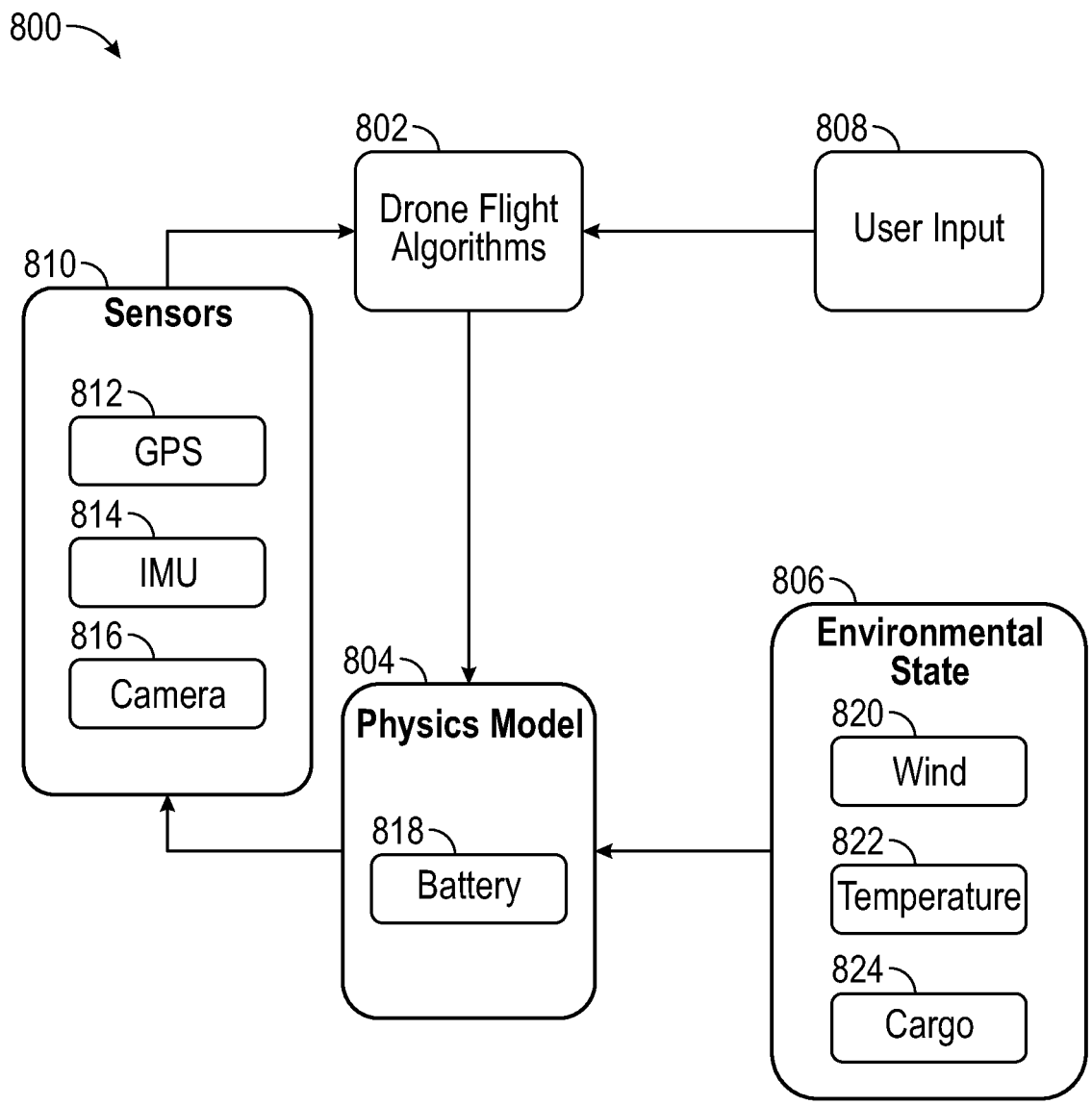
FIG. 8 shows a diagram illustrating various computational and physical elements for performing a simulation for vehicle-based item delivery, in accordance with example embodiments of the disclosure.

FIG. 8 shows a diagram illustrating various computational and physical elements for performing a simulation for vehicle-based item delivery, in accordance with example embodiments of the disclosure. Diagram 800 includes a drone flight-algorithms block 802, a physics model block 804, an environmental state block 806, a user input block 808, and a sensors block 810. In particular, users may provide user input at user input block 808 to inform the drone flight algorithms 802. The user input may include information related to various preferences of the users, activities that the users are engaged in currently, locations that the users may be visiting, and/or the like.

In some aspects, the sensors block 810 may include, but not be limited to, various devices such as a GPS 812, an IMU 814, and a camera 816. The sensors can provide raw data to the drone flight algorithms at drone flight algorithms block 802. Accordingly, the drone flight algorithms may process the data to make various waypoint in navigation determinations as described variously herein. For example, the GPS 812 may determine a location of a vehicle or a drone and may provide that location in real time to the drone flight algorithms 802. Similarly, camera 816 may provide imagery to the drone flight algorithms.

In some examples, the drone flight algorithms 802 may rely upon one or more physics models as depicted by physics model block 804. In particular, the physics model may consider a battery 818 power level model. Alternatively or additionally, the physics model 804 may take into account the environmental state in which a drone will be operating. For example, the physics model 804 may consider various factors such as the wind 820, temperature 822, and cargo 824, as depicted in environmental state block 806.

In some examples, the physics model can send GPS and orientations data to the modeled sensors. In other examples, the sensor model can simulate errors and inaccuracies that are consistent with real world sensors and can send these errors and inaccuracies to the flight algorithms. The flight algorithms can consider GPS positional data to determine the desired direction and adjust power to propellers. In some aspects, the physics model can add updated power values to modeled propellers, rotates drone, and calculates the forward speed of the drones. In other aspects, updated orientation, speed, and position information can be passed through the sensor models to the flight algorithms, which can maintain a flight path of a drone to a given destination.

In some examples, the simulation can be performed using a first-pass usability testing with default drone models available, for example, in simulation game engines. The disclosed systems can perform additional testing using a more detailed drone model that can be tailored to specific drones. The additional testing can be performed using models for the environment, including weather conditions, and the size and weight of the items that the drones deliver. Further, the testing can include models for the drone's inputs, including a drone's IMU, GPS, and associated user instructions. The testing can include models for drone's firmware, including the drone's actual flight algorithms. The testing can include a physical model of the drone, including the drone's propeller forces and battery drain. Some of these parameters (e.g., the IMU and GPS inputs) can be subjected to environmental errors. In some examples, the models of the drones can be tested by performing comparisons to real world data collected from the physical drone. For example, drones equipped with wind sensors can be flown under a variety of conditions, many of which can be simulated in a wind tunnel. The real-world testing can include different item sizes, shapes, and weights. As noted, sources of error can then be identified, and the model can be iterated for better accuracy. Once an error is found to be below an acceptable amount, that amount of error can be introduced in the simulation and can be used for simulating delivery scenarios.

In some aspects, drone batteries can degrade over time, depending on use and number of recharge cycles. The disclosed systems can incorporate models of the batteries at various stages of life into the simulation as one of the scenario variables. In some examples, the disclosed systems can model the capacity degradation of the drone battery using a model that incorporates theoretical modeling and empirical observations, for instance, a linear and non-linear combined degradation model. Such a model can include parameters such as the calendar age of the battery, the cycle depth of discharge, the cycle-average state of charge, and the battery's operating temperatures. In other aspects, a battery's aging can be characterized using parameters such as a residual capacity, an internal resistance, a peak power, and an open circuit voltage (OCV). A black box modeling approach can be used to estimate these parameters as a function of time and usage conditions. In other aspects, the model can use a multiple linear regression (RLM) method on the experimental data that contains OCV values. Alternatively or additionally, a support vector machine (SVM) model can be used to satisfy results for the parameters associated with the battery's aging. In some examples, the simulations can model residual capacity using the linear and non-linear combined degradation models, and an SVM to model overall battery aging.

In some aspects, the disclosed systems may produce a simulation using a physics-based engine to accurately depict movement using appropriate formalisms (e.g., Newtonian mechanics). In some examples, the input to the physics-based engine can be modular, allowing the testing of a variety of vehicles, drones, and weather conditions, as these conditions can affect drone range.

In other examples, the disclosed systems can augment the simulator's physics engine to simulate battery degradations with drone age by taking the number of recharge cycles on the battery as a simulation condition and modifying battery capacity and internal resistance accordingly. In other aspects, the physics-based model of the drone can include an architecture based on a multi-agent simulation architecture specifically designed for UAVs. In some examples, the drone body can be treated as a single rigid body, and each rotor can be modeled independently. In other examples, drone firmware may be used to determine the drone's behavioral algorithms. If such firmware is not available, the drone's ground speed and altitude can be controlled by two or more nested proportional integral derivative (PID) controllers. In some aspects, the GUIs and real-world modeling of the drone's environment can be off-loaded to conventional gaming industry-based simulation techniques.

Figure 9:
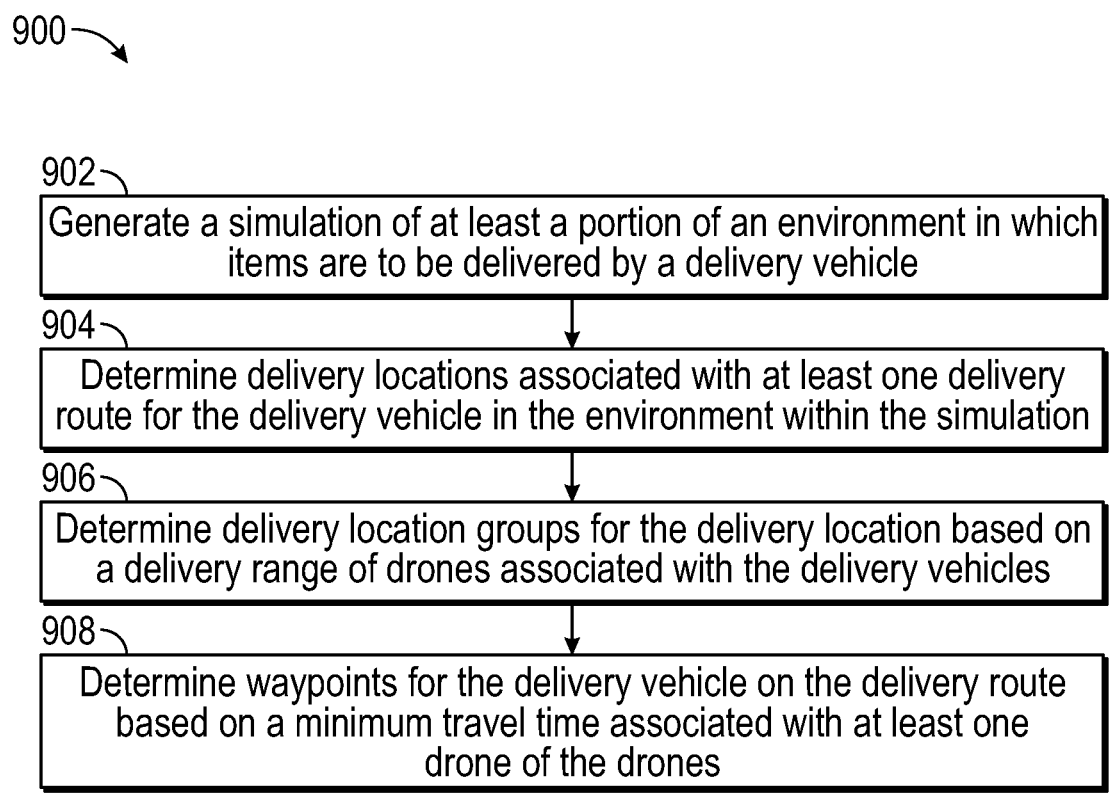
FIG. 9 illustrates a flow chart of example operations for performing a simulation for vehicle-based item delivery, in accordance with example embodiments of the disclosure.

FIG. 9 illustrates a flow chart of example operations for performing a simulation for vehicle-based item delivery, in accordance with example embodiments of the disclosure. At block 902, the method can include generating a simulation of at least a portion of an environment in which items are to be delivered by a delivery vehicle. In some examples, the disclosed systems can present a graphical user interface for the simulation that comprises a status of a delivery of an item to a delivery location of the delivery locations, a package state, and a drone operational state.

At block 904, the method can include determining delivery locations associated with at least one delivery route for the delivery vehicle in the environment within the simulation. In particular, the delivery locations can be determined based on the intended destinations of the packages to be delivered.

At block 906, the method can include determining delivery location groups for the delivery location based on a delivery range of drones associated with the delivery vehicle. In some examples, determining the delivery location groups can include determining circles on a map, the circles having radii based on a delivery range of the drones available on the delivery vehicle. Further, determining the delivery location groups can include determining the overlap areas where two or more circles of the circles overlap, and determining the delivery location groups that maximize a number of circles that overlap.

At block 908, the method can include determining waypoints for the delivery vehicle on the delivery route based on a minimum travel time associated with at least one drone of the drones. In some examples, determining the waypoints can include determining a circle of a smallest radius on a map that encompasses the delivery locations, and determining a waypoint of the waypoints at a center of the circle.

In other examples, the disclosed systems can determine that a distance between the delivery location groups is below a predetermined threshold, and the disclosed systems can determine a waypoint of the waypoints at an approximate location of a centroid of a polygon comprising vertices formed by the delivery locations in the delivery location group.

In some examples, generating the simulation can include generating a physics-based model that is based on at least one of an environmental parameter or a power capacity associated with the drone, and generate second waypoints based on the physics-based model. The physics-based model can include at least one of a number of recharge cycles on a drone battery, a capacity of the drone battery, or an internal resistance of the drone battery.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor associated with a memory, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, comprising:
   at least one memory device that stores computer-executable instructions; and
   at least one processor configured to access the at least one memory device, wherein the at least one processor is configured to execute the computer-executable instructions to:
   generate a simulation of at least a portion of an environment in which items are to be delivered by a delivery vehicle;
   determine delivery locations associated with at least one delivery route for the delivery vehicle in the environment within the simulation;
   determine delivery location groups for the delivery location based on a delivery range of drones associated with the delivery vehicles;
   determine waypoints for the delivery vehicle on the delivery route based on a minimum travel time associated with at least one drone of the drones; and
   generate a physics-based model that is based on at least one of an environmental parameter or a power capacity associated with the drone; and
   generate second waypoints based on the physics-based model.

2. The device of claim 1, wherein the physics-based model comprises at least one of a number of recharge cycles on a drone battery, a capacity of the drone battery, or an internal resistance of the drone battery.

3. The device of claim 1, wherein determining the delivery location groups further comprises:
   determining circles on a map, the circles having radii based on a delivery range of the drones available on the delivery vehicle;
   determining overlap areas where two or more circles of the circles overlap; and
   determining the delivery location groups that maximize a number of circles that overlap.

4. The device of claim 1, wherein determining the waypoints comprises:
   determining a circle of a smallest radius on a map that encompasses the delivery locations; and
   determining a waypoint of the waypoints at a center of the circle.

5. The device of claim 1, wherein the computer-executable instructions further comprise instructions to:
   determine that a distance between the delivery location groups is below a predetermined threshold; and
   determine a waypoint of the waypoints at an approximate location of a centroid of a polygon comprising vertices formed by the delivery locations in the delivery location group.

6. The device of claim 1, wherein the computer-executable instructions further comprise instructions to:
   present a graphical user interface for the simulation that comprises a status of a delivery of an item to a delivery location of the delivery locations, a package state, and a drone operational state.

7. A method, comprising:
   generating a simulation of at least a portion of an environment in which items are to be delivered by a delivery vehicle;
   determining delivery locations associated with at least one delivery route for the delivery vehicle in the environment within the simulation;
   determining delivery location groups for the delivery location based on a delivery range of drones associated with the delivery vehicles, wherein determining the delivery location groups further comprises:
   determining circles on a map, the circles having radii based on a delivery range of the drones available on the delivery vehicle;
   determining overlap areas where two or more circles of the circles overlap; and
   determining the delivery location groups that maximize a number of circles that overlap; and
   determining waypoints for the delivery vehicle on the delivery route based on a minimum travel time associated with at least one drone of the drones.

8. The method of claim 7, wherein the method further comprises:
   generating a physics-based model that is based on at least one of an environmental parameter or a power capacity associated with the drone; and
   generating second waypoints based on the physics-based model.

9. The method of claim 8, wherein the physics-based model comprises at least one of a number of recharge cycles on a drone battery, a capacity of the drone battery, or an internal resistance of the drone battery.

10. The method of claim 7, wherein determining the waypoints comprises:
    determining a circle of a smallest radius on a map that encompasses the delivery locations; and
    determining a waypoint of the waypoints at a center of the circle.

11. The method of claim 7, wherein the computer-executable instructions further comprise instructions to:
    determine that a distance between the delivery location groups is below a predetermined threshold; and
    determine a waypoint of the waypoints at an approximate location of a centroid of a polygon comprising vertices formed by the delivery locations in the delivery location group.

12. The method of claim 7, wherein the computer-executable instructions further comprise instructions to:
    present a graphical user interface for the simulation that comprises a status of a delivery of an item to a delivery location of the delivery locations, a package state, and a drone operational state.

13. A non-transitory computer-readable medium storing computer-executable instructions which, when executed by a processor, cause the processor to perform operations comprising:
    generating a simulation of at least a portion of an environment in which items are to be delivered by a delivery vehicle;
    determining delivery locations associated with at least one delivery route for the delivery vehicle in the environment within the simulation;
    determining delivery location groups for the delivery location based on a delivery range of drones associated with the delivery vehicles; and
    determining waypoints for the delivery vehicle on the delivery route based on a minimum travel time associated with at least one drone of the drones, wherein determining the waypoints comprises:
    determining a circle of a smallest radius on a map that encompasses the delivery locations; and
    determining a waypoint of the waypoints at a center of the circle.

14. The non-transitory computer-readable medium of claim 13, wherein the computer-executable instructions further comprise computer-executable instructions to:
    generate a physics-based model that is based on at least one of an environmental parameter or a power capacity associated with the drone; and
    generate second waypoints based on the physics-based model.

15. The non-transitory computer-readable medium of claim 14, wherein the physics-based model comprises at least one of a number of recharge cycles on a drone battery, a capacity of the drone battery, or an internal resistance of the drone battery.

16. The non-transitory computer-readable medium of claim 13, wherein determining the delivery location groups further comprises:
    determining circles on a map, the circles having radii based on a delivery range of the drones available on the delivery vehicle;
    determining overlap areas where two or more circles of the circles overlap; and
    determining the delivery location groups that maximize a number of circles that overlap.

17. The non-transitory computer-readable medium of claim 13, wherein the computer-executable instructions further comprise instructions to:
    determine that a distance between the delivery location groups is below a predetermined threshold; and
    determine a waypoint of the waypoints at an approximate location of a centroid of a polygon comprising vertices formed by the delivery locations in the delivery location group.

18. A device, comprising:
at least one memory device that stores computer-executable instructions; and
at least one processor configured to access the at least one memory device, wherein the at least one processor is configured to execute the computer-executable instructions to:
    generate a simulation of at least a portion of an environment in which items are to be delivered by a delivery vehicle;
    determine delivery locations associated with at least one delivery route for the delivery vehicle in the environment within the simulation;
    determine delivery location groups for the delivery location based on a delivery range of drones associated with the delivery vehicles;
    determine waypoints for the delivery vehicle on the delivery route based on a minimum travel time associated with at least one drone of the drones;
    determine that a distance between the delivery location groups is below a predetermined threshold; and
    determine a waypoint of the waypoints at an approximate location of a centroid of a polygon comprising vertices formed by the delivery locations in the delivery location group.

* * * * *